United States Patent [19]

Hoecherl

[11] Patent Number: 4,829,695

[45] Date of Patent: May 16, 1989

[54] WATERFOWL DECOY PROTECTIVE COATING

[76] Inventor: Carl H. Hoecherl, 1031 Leith Dr., Maumee, Ohio 43537

[21] Appl. No.: 150,543

[22] Filed: Feb. 1, 1988

[51] Int. Cl.$^4$ .......................................... A01M 31/06
[52] U.S. Cl. ........................................................ 43/3
[58] Field of Search ............ 43/3; 428/16, 71, 319.9; 427/203, 208, 213.31

[56] References Cited

U.S. PATENT DOCUMENTS

| | | | |
|---|---|---|---|
| 547,033 | 10/1895 | Ross | 43/3 |
| 1,031,613 | 7/1912 | Antoni | 427/203 |
| 2,100,623 | 11/1937 | Bates | 43/3 |
| 2,518,721 | 8/1950 | Risch | 43/3 |
| 2,880,544 | 4/1959 | Crummer et al. | 43/3 |
| 3,503,822 | 0/3197 | Turkewitsch . | |
| 3,666,521 | 5/1972 | Weyna . | |
| 3,968,274 | 7/1976 | Harris . | |
| 3,979,487 | 9/1976 | Squier . | |
| 4,450,642 | 5/1984 | Dekezel et al. | 43/3 |
| 4,693,911 | 9/1987 | Moreau . | |

FOREIGN PATENT DOCUMENTS 327063  3/1930  United Kingdom .................... 43/3

Primary Examiner—Kurt Rowan
Attorney, Agent, or Firm—Donald R. Bahr

[57] ABSTRACT

The present invention is concerned with the art of waterfowl decoys and in particular protective coatings which are applied to waterfowl decoy bodies. The protective coating comprises a base coat, a layer of granular corn cobs and a sealing coat. The protective coating of the invention greatly enhances the abrasion resistance and durability of the water fowl decoy to which it is applied. The protective coating in question is particularly suited for use on decoy bodies which are formed from cellular polymeric materials.

20 Claims, 1 Drawing Sheet

WATERFOWL DECOY PROTECTIVE COATING

FIELD OF THE INVENTION

The present invention relates generally to waterfowl decoys and, more specifically to a protective coating for a waterflow decoys.

BACKGROUND OF THE INVENTION

The art of attracting waterfowl with decoys goes back thousands of years. From ancient history it is known that the ancients formed decoys from rushes, reeds and small twigs. Due to their construction these decoys waterfowlere only suitable for use on dry land. That is they were not suitable for use in a floating mode. The art of decoy manufacture progressed over the centuries until a high point was reached in the manufacture of decoys from carved wooden blocks. While many types of wood have been used as a raw material for carved decoys cedar was a preferred material as the density of cedar is such that the resulting decoys would float in water in such a manner as to resemble a natural swimming waterfowl. While cedar produced excellent decoys the cost of the raw materials and the labor content in making and carving the decoys has severely restricted its use in modern times.

Subsequent to cedar material cork became a preferred raw material for the manufacture of waterfowl decoys. While cork has the proper buoyancy its usage has been restricted due to the excessive cost of natural cork.

With the advent of modern technology polymeric materials have become the most widely used material for decoys over the past twenty five years. Decoys formed from polymeric materials have been of two principal types these being hollow and solid. The hollow decoys are usually formed from hard unfoamed polymeric materials. The solid decoys are in turn usually formed from a foamed or cellular polymeric material. It is those latter mentioned cellular decoys with which the protective coating of this invention is particularly useful.

These cellular decoys are desirable in that they are light and easy to use and yet the density of the overall structure and can be easily regulated to produce a finished decoy that floats in the water in a manner which approximates live natural waterfowl.

In addition to the above described materials, fibrous materials have been shaped into decoys wherein the fibers have been waterproofed with a binder. This method of construction has been used principally on low cost waterfowl decoys.

The above mentioned solid waterfowl decoys are formed from a polymeric material which is foamed to produce a cellular structure, has achieved widespread commercial acceptance. In addition to being light in weight this type of decoy can be cheaply and easily manufactured.

While many types of cellular materials can be used foamed polystyrene is the most widely used material due to the fact that it is low in cost and easy to form it into a waterfowl decoy.

It is understood by one skilled in the art that the above discussion relates to the body which is used to form the waterfowl decoy. For various reasons decoy heads which are formed from other materials are often attached to the above described decoy bodies.

A common problem with all of the above desired waterfowl decoys has been durability. This durability problem has been two phased these phases being structural and surface. This invention is concerned with waterfowl surface durability.

Waterfowl decoys are often subjected to usage under the most adverse conditions. These conditions include rough handling and transportation and usage under freeze-thaw conditions. These problems make surface durability a major problem in that decoys often have to be refurbished after a single season os usage. This durabilty problem is particularly acute with decoys which are formed from cellular polymer materials as while these decoys have adequate structural strength, because of the cellular nature of the polymeric materials the surfaces of these waterfowl decoys tend to be soft and not abrasion resistant.

DESCRIPTION OF THE PRIOR ART

U.S. Pat. No. 3,666,521 discloses a multilayer floor coating wherein inorganic aggregates are bound between a base coat and a top coat.

U.S. Pat. No. 3,979,487 shows a multilayer polymer composition wherein a flocking is bound to a base.

U.S. Pat. No. 3,503,822 is concerned with a process for improving the wear resistance of a cellular polyurethane surface.

It should be noted that none of the above discussed references discuss the application of the coatings in question to waterfowl decoys.

The foregoing has outlined rather broadly the more pertinent and important features of the present invention in order that the detailed description of the invention that follows may be better understood whereby the present contribution to the art may be more fully appreciated. Additional features of the invention will be described hereinafter which form the subject of the claims of the present invention. It should be appreciated by those skilled in the art that the conception and the specific embodiment disclosed herein may be readily utilized as a basis for modifying or designing other structures for carrying out the same purposes of the present invention. It should also be realized by those skilled in the art that such equivalent structures do not depart from the spirit and scope of this invention.

DESCRIPTION OF THE PREFERRED EMBODIMENT

Figure 1:
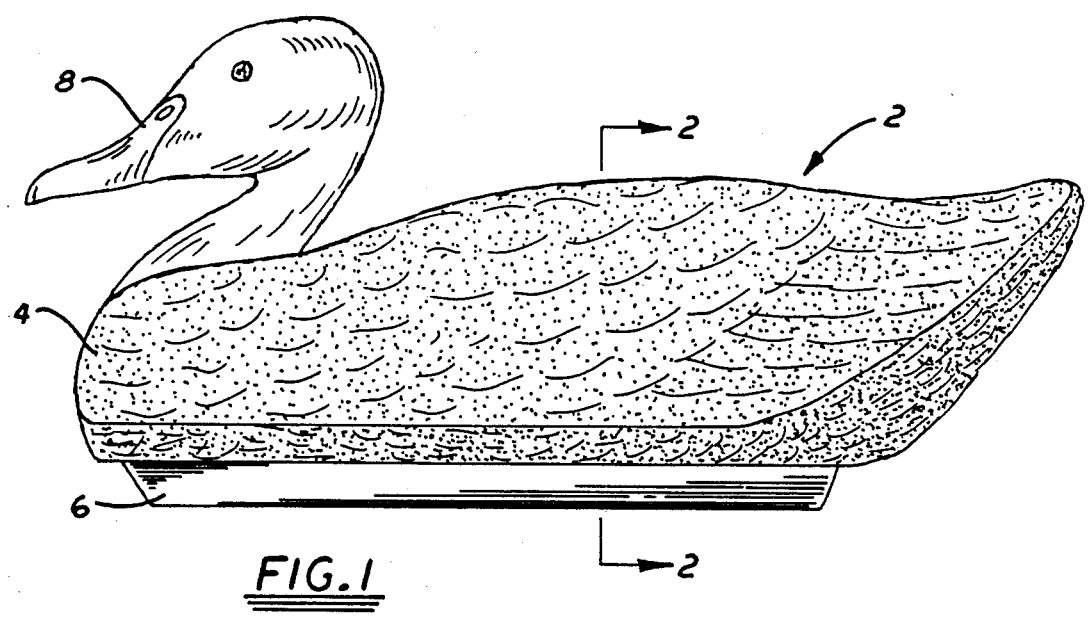
FIG. 1 is a side view of a finished waterfowl decoy which incorporates the protective coating of this invention.

Referring to FIG. 1 it can be seen that a typical waterfowl decoy 2 consists of a body section 4 to which is attached a keel 6 and a head section 8. This invention is concerned with a protective coating which is applied to the outer surface of body section 4.

Body section 4 can be formed from any suitable cellular polymeric material such as cellular thermosetting and thermoplastic materials. In accordance with the preferred embodiment of this invention body section 4 is formed from cellular expanded polystyrene beads wherein the resulting material has a density of about 4 pounds per cubic foot.

Figure 2:
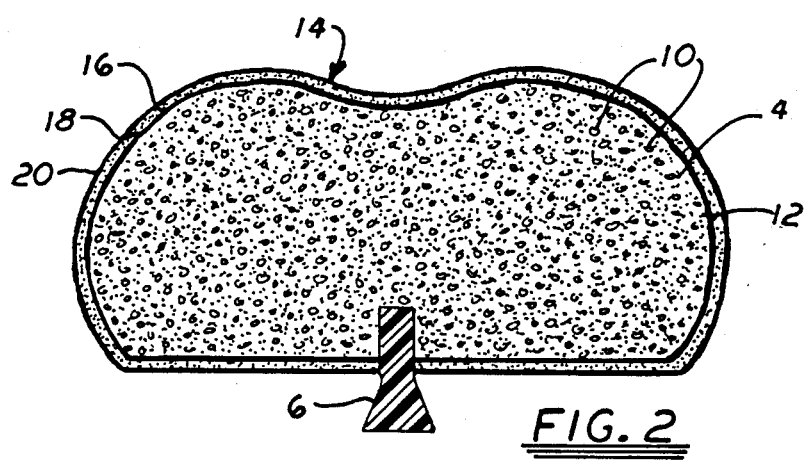
FIG. 2 is a sectional view through line 1-1 of FIG. 1 showing the protective coating of this invention.

It can be seen from the sectional view of FIG. 2 that while body section 4 appears to be sold it is actually formed from a foamed cellular material which is exemplified by cells 10. It is understood that cells 10 as illustrated are not meant to be illustrative of the actual cell sizes of polymeric materials used to form waterfowl decoys. The cell size can be regulated by one skilled in the art to produce the proper density in the resulting decoy body. Because body section 4 is formed from millions of hallow polymeric cells surface area 12 of body section 4 tends to be soft. In accordance with this invention a composite protective coating 14 is appied to body section 4 in order to produce a tough durable surface.

Figure 3:
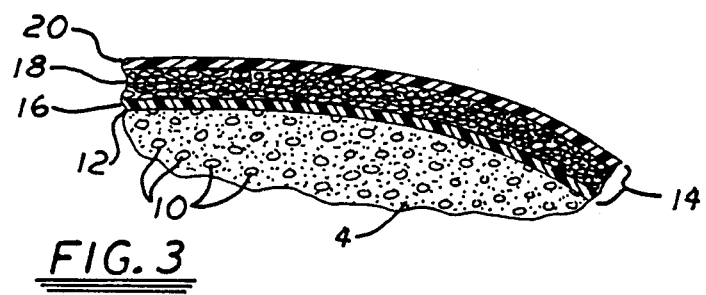
FIG. 3 is an enlarged view of a surface section of a waterfowl decoy which uses the subject invention.

Composite protective coating 14, as is shown in FIGS. 2 and 3 comprises a base coating 16, a layer of ground corn cobs 18 and a sealing coating 20.

Body section 4 is formed by the foaming of a polymeric material in a suitable mold. Base coating 16 is then applied to the preformed body section by any suitable method such as by spraying or brushing.

While base coating is still wet or tacky, dry ground corn cobs are applied thereto. These granular corn cobs are applied by any suitable method such as sprinkling the corn cobs onto the wet or tacky surface. This coating may be further effected by rolling the coated, tacky body section 4 in a bin of dry granular corn cobs. Further the dry granular corn cobs may be blown onto the wet or tacky surface.

After application of granular corn cob layer 18 to base coat 16 is allowed to dry for a suitable period of time. The drying time naturally depends on the nature of base coat 14.

After base coat 14 is dry a sealing coat 20 is applied over ground corn cob layer 18 to produce a tough composite protective coating for body section 4.

Base coat 16 and sealing coat 20 can be either an air dried or catalyst cured material. Examples of suitable catalyst cured systems are peroxide cured polyester resins and two part epoxy resins. Examples of air dried materials which may be used, are oil and water based paints. Due to their low cost and ease of application water based paints are preferred for use in this invnetion. Water based latex paints are the most preferred compositions for the formation of base coat 16 and sealing coat 20. Because base coat must act as a binder for ground corn cob layer 18 base coat 14 must be formed from a material which has a high solid content and conversely a low solvent content.

A water based paint system that is suitable for the formation of base coat 6 and sealing coat 20 has the following composition as listed in Table 1.

TABLE I

| | |
|---|---|
| PIGMENT | 30.1% |
| Silicates | 30.1% |
| VEHICLE | 69.9% |
| Acrylic and Vinyl Copolymer Resins | 20.3% |
| Glycols | 4.6% |
| Alpiphatic Glycol Esters | 1.9% |
| Water | 43.1% |
| | 100.0% |

In accordance with the above description composite protecive coating 14 comprises a base coat 16, a granular corn cob layer 18 and a sealing coating 20. Base coating 16 can be from about 4 to about 8 mils thick, granular corn cob layer 18 can be from about 25 to about 35 mils thick and sealing coat 20 can be from about 5 to about 9 mils thick. Accordingly composite protective coating 14 can be from about 34 to about 52 mils thick. In accordance with the preferred embodiment base coat 16 is about 5 mils thick, granular corn cob layer 18 is about 30 mils thick and sealing coat 20 is about 7 mils thick. This preferred embodiment gives protective coating 14 a thickness of about 42 mils.

The hardness of finished protective coating varies with time after sealing coat 20 is applied. The uncoated surface of body section 4 has a Shore hardness of about 55 after aging for 30 days. The finished protective coating in accordance with this invention had a Shore hardness of 75. All hardness were measured in accordance with A.S.T.M. Test 2240 on the Shore A scale. As can be seen from this hardness increase the surface of body section 4 is toughened by use of the protective coating of this invention.

Granular corn cob layer 18 is formed from particles which are derived from the woody portion of the corn cob. The woody portion has a hardness of about 4.5 on the Mohs XX scale. Suitable products for use as layer 18 are products sold under the trademarks Grit-o-Cobs 2040 and Grit-O-Cobs 4060 by the Andersons Cob Division P.O. Box 119 Maumee, Ohio 43537

A preferred composition for use as layer 18 is a 50-50 mixture of Grit-O-Cobs 2040 has an average mesh size of 30 and approximately 4,300,000 particles per pound. Grit-O-Cobs 40-60 has an average mesh size of 50 and approximately 1,500,00 particles per pound.

In this application when an average mesh size is given it means that the particular granular particles will pass through one size mesh screen and be retained by a mesh screen 20 digits higher, for example, granular particles having an average for mesh size of 50 will pass through a 40 mesh screen and be retained by a 60 mesh screen.

In order to produce a finished waterfowl decoy a finished paint coating is applied over sealing coat 20. This finished paint coating will be of the proper color and feather pattern of the waterfowl which the decoy is meant to imitate.

When protective coating 14 is applied over body section 4, the surface durability of body section 4 is greatly enhanced. This increase in durability allows the decoy in question to be used for an extended period of time before the surface must be refurbished. Further, protective coating 14 is advantageous in that it is semi rough and therefore resembles the surface texture of a live waterfowl.

The present disclosure includes the information contained in the appended claims as well as that in the foregoing description. Although the invention has been described in its preferred form or embodiment with a certain degree of particularity, it is understood that the present disclosure of the preferred form has been made only by way of example and that numerous changes in the details of construction, fabrication and use including the combination and arrangement of parts, may be restored to without departing from the spirit and scope of the invention.

What is claimed is:

1. A waterfowl decoy comprising a body portion and a composite protective coating wherein said protective coating comprises a base coat, a layer of granular corn cobs and a sealing coating.

2. The waterfowl decoy of claim 1 wherein said body portion is formed from a cellular polymeric material.

3. The waterfowl decoy of claim 1 wherein said body portion is formed from expanded polystyrene beads.

4. The waterfowl decoy of claim 1 wherein said base coat is from about 4 to about 8 mils thick, said layer of granular corn cobs is from about 25 to about 35 mils thick and said sealing coat is from about 5 to about 9 mils thick.

5. The waterfowl decoy of claim 2 wherein said base coat is from about 4 to about 8 mils thick, said layer of granular corn cobs is from about 25 to about 35 mils thick and said sealing coat is from about 5 to about 9 mils thick.

6. The waterfowl decoy of claim 3 wherein said base coat is from about 4 to about 8 mils thick, said layer of granular corn cobs is from about 25 to about 35 mils thick and said sealing coat is from about 5 to about 9 mils thick.

7. The waterfowl decoy of claim 1 wherein the base coat is about 5 mils thick, said layer of granular corn cobs is about 30 mils thick and said sealing coat is about 7 mils thick.

8. The waterfowl decoy of claim 2 wherein the base coat is about 5 mils thick, said layer of granular corn cobs is about 30 mils thick and said sealing coat is about 7 mils thick.

9. The waterfowl decoy of claim 3 wherein the base coat is about 5 mils thick, said layer of granular corn cobs is about 30 mils thick and said sealing coat is about 7 mils thick.

10. The waterfowl decoy of claim 4 wherein said base coat and said sealing coat are formed from a water based acrylic latex paint.

11. The waterfowl decoy of claim 5 wherein said base coat and said sealing coat are formed from a water based acrylic latex paint.

12. The waterfowl decoy of claim 6 wherein said base coat and said sealing coat are formed from a water based acrylic latex paint.

13. The waterfowl decoy of claim 7 wherein the said base coat and said sealing coat are formed from a water based acrylic latex paint which has a vehicle content of approximately 70 percent.

14. The waterfowl decoy of claim 8 wherein the said base coat and said sealing coat are formed from a water based acrylic latex paint which has a vehicle content of approximately 70 percent.

15. The waterfowl decoy of claim 9 wherein the said base coat and said sealing coat are formed from a water based acrylic latex paint which has a vehicle content of approximately 70 percent.

16. The waterfowl decoy of claim 5 wherein said layer of granular corn cobs is formed from a granular corn cobs which have a Mohs hardness of about 4.5 and an average mesh size of about 40.

17. The waterfowl decoy of claim 6 wherein said layer of granular corn cobs is formed from granular corn cobs which have a Mohs hardness of about 4.5 and an average mesh size of about 40.

18. The waterfowl decoy of claim 7 wherein said layer of granular corn cobs is formed from a 50—50 mixture of 30 and 50 average mesh size granular corn cob which have a Mohs hardness of about 4.5.

19. The waterfowl decoy of claim 8 wherein said layer of granular corn cobs is formed from a 50—50 mixture of 30 and 50 average mesh size granular corn cobs which have a Mohs hardness of about 4.5.

20. The waterfowl decoy of claim 9 wherein said layer of granular corn cobs is formed from a 50—50 mixture of 30 and 50 average mesh size granular corn cobs which have a Mohs hardness of about 4.5.

* * * * *